United States Patent
Park et al.

(10) Patent No.: US 11,555,096 B2
(45) Date of Patent: Jan. 17, 2023

(54) PROTECTIVE WINDOW INCLUDING A HARD COATING LAYER AND FLEXIBLE DISPLAY DEVICE INCLUDING THE SAME

(71) Applicant: Samsung Display Co., LTD., Yongin-si (KR)

(72) Inventors: Young-Sang Park, Seoul (KR); Young Moon Kim, Asan-si (KR); Kicheol Song, Suwon-si (KR); Hung Kun Ahn, Seongnam-si (KR); Kyou Jong Park, Yongin-si (KR); Sung Guk An, Suwon-si (KR); Jang Doo Lee, Hwaseong-si (KR); Jeong Chul Ho, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 371 days.

(21) Appl. No.: 16/808,528

(22) Filed: Mar. 4, 2020

(65) Prior Publication Data
US 2020/0339774 A1 Oct. 29, 2020

(30) Foreign Application Priority Data
Apr. 25, 2019 (KR) .................. 10-2019-0048368

(51) Int. Cl.
| | | |
|---|---|---|
| *G02B 1/16* | (2015.01) | |
| *C08L 79/08* | (2006.01) | |
| *C08K 3/22* | (2006.01) | |
| *C08J 7/046* | (2020.01) | |
| *C09D 7/47* | (2018.01) | |
| *C09D 7/61* | (2018.01) | |
| *C09D 133/08* | (2006.01) | |
| *C09D 133/10* | (2006.01) | |

(52) U.S. Cl.
CPC ............. *C08J 7/046* (2020.01); *C08K 3/2279* (2013.01); *C09D 7/47* (2018.01); *C09D 7/61* (2018.01); *C09D 133/08* (2013.01); *C09D 133/10* (2013.01); *G02B 1/16* (2015.01); *C08J 2333/08* (2013.01); *C08J 2333/10* (2013.01); *C08J 2483/04* (2013.01); *C08K 2003/2231* (2013.01); *C08K 2201/017* (2013.01)

(58) Field of Classification Search
CPC ......... C08J 7/046; C08J 2483/04; C09D 7/47; C09D 7/61; C08K 3/2279; C08K 2003/223; C08K 2201/017; G02B 1/16
See application file for complete search history.

(56) References Cited

U.S. PATENT DOCUMENTS

| | | | |
|---|---|---|---|
| 8,929,085 B2 | 1/2015 | Franklin et al. | |
| 9,069,521 B2 | 6/2015 | Lee et al. | |
| 9,429,999 B2 | 8/2016 | Lee et al. | |
| 10,281,956 B2 | 5/2019 | Yang et al. | |
| 2010/0067109 A1* | 3/2010 | Horio | G02B 1/111 359/485.01 |
| 2010/0096970 A1* | 4/2010 | Itoh | H01J 1/70 313/313 |
| 2010/0118309 A1* | 5/2010 | Itoh | G01N 21/4738 359/507 |
| 2015/0004397 A1* | 1/2015 | Horio | G02B 1/16 428/522 |
| 2019/0276669 A1* | 9/2019 | Kourtakis | C08K 5/0041 |

FOREIGN PATENT DOCUMENTS

| | | | |
|---|---|---|---|
| JP | 2006106714 A | 4/2006 | |
| JP | 2019116048 A * | 7/2019 | |
| KR | 101930729 B1 | 12/2018 | |
| WO | WO-2018212547 A1 * | 11/2018 | ............. B32B 27/08 |

OTHER PUBLICATIONS

Machine translation into English of JP 2019-116048A; Omori et al (Year (2019).*
The machine trnslation into English of WO 2018-212547A1; Kim et al (Year: 2018).*

* cited by examiner

*Primary Examiner* — Karuna P Reddy
(74) *Attorney, Agent, or Firm* — Cantor Colburn LLP

(57) ABSTRACT

A protective window includes a flexible base film and a hard coating layer disposed on the flexible base film. The hard coating layer includes a silicone leveling agent and an inorganic antistatic agent. The coating layer includes an upper area and a lower area disposed between the upper area and the flexible base film, and a density of the inorganic antistatic agent in the lower area is greater than a density of the inorganic antistatic agent in the upper area.

19 Claims, 4 Drawing Sheets

PROTECTIVE WINDOW INCLUDING A HARD COATING LAYER AND FLEXIBLE DISPLAY DEVICE INCLUDING THE SAME

CROSS-REFERENCE TO RELATED APPLICATION

This application claims priority to and the benefit of Korean Patent Application No. 10-2019-0048368 filed on Apr. 25, 2019 in the Korean Intellectual Property Office, and all the benefits accruing therefrom under 35 U.S.C. § 119, the content of which in its entirety is herein incorporated by reference.

BACKGROUND

1. Field

Exemplary embodiments relate to a protective window. More particularly, exemplary embodiments relate to a protective window including a hard coating layer and a flexible display device including the protective window.

2. Description of the Related Art

A plastic film (plastic substrate) may be used as a window of a display device to reduce a weight of the display device or to implement, e.g., provide a flexible display device.

SUMMARY

Exemplary embodiments provide a protective window having improved reliability including a hard coating layer.

Exemplary embodiments provide a display device including the protective window.

According to an exemplary embodiment, a protective window includes a flexible base film and a hard coating layer disposed on the flexible base film. The hard coating layer includes a silicone leveling agent and an inorganic antistatic agent. The coating layer includes an upper area and a lower area disposed between the upper area and the flexible base film, and a density of the inorganic antistatic agent in the upper area is greater than a density of the inorganic antistatic agent in the lower area.

In an exemplary embodiment, the flexible base film includes PMMA (polymethyl methacrylate), PC (polycarbonate), PEN (polyethylene naphthalate), polyvinylidene chloride, PVDF (polyvinylidene difluoride), polystyrene, ethylene vinyl alcohol copolymer, or a combination thereof.

In an exemplary embodiment, the inorganic antistatic agent includes oxide, zinc oxide, tin oxide, antimony oxide, or a combination thereof.

In an exemplary embodiment, the inorganic antistatic agent includes $Sb_2O_5$, $SnO_2$, or a combination thereof.

In an exemplary embodiment, a content of the silicone leveling agent in the hard coating layer is equal to or less than 2 weight percent (wt %), and a content of the inorganic antistatic agent in the hard coating layer is equal to or less than 2 wt %.

In an exemplary embodiment, a content of the silicone leveling agent in the hard coating layer is 0.1 wt % to 1 wt %, and a content of the inorganic antistatic agent in the hard coating layer is 0.05 wt % to 0.5 wt %.

In an exemplary embodiment, the hard coating layer further includes a cured product of a (meth)acrylate compound.

In an exemplary embodiment, a surface roughness (RMS) of the hard coating layer is 1 nanometer (nm) to 2 nm.

In an exemplary embodiment, the hard coating layer includes an anti-fingerprint layer, the anti-fingerprint layer including a fluorine-containing compound.

In an exemplary embodiment, the protective window further includes an interfacial layer between the hard coating layer and the flexible base film, and including a first component of the flexible base film and a second component of the hard coating layer, wherein a thickness of the interfacial layer is equal to or less than 1 micrometer (μm).

In an exemplary embodiment, a moisture absorption of the hard coating layer is equal to or less than 2% at 60° C. and 93% humidity.

According to an exemplary embodiment, a display device includes a base substrate, a light-emitting element array disposed on the base substrate, an encapsulation layer covering the light-emitting element array and a protective window disposed on the encapsulation layer. The protective window includes a flexible base film and a hard coating layer disposed on the flexible base film. The hard coating layer includes a silicone (i.e., a silicone-based) leveling agent and an inorganic antistatic agent. The coating layer includes an upper area and a lower is area disposed between the upper area and the flexible base film, and a density of the inorganic antistatic agent in the upper area is greater than a density of the inorganic antistatic agent in the lower area.

According to an exemplary embodiment, a hard coating layer includes a silicone leveling agent and a metal oxide antistatic agent. Thus, a content of ionic materials in the hard coating layer may be reduced. Furthermore, a density of an inorganic antistatic agent in a surface area of the hard coating layer may be increased by combination of the silicone leveling agent and the inorganic antistatic agent.

Thus, a moisture absorption of the hard coating layer and the base film may be reduced. Thus, damage (for example, wrinkle, whitening, or crack) to or in a protective window including the hard coating layer may be prevented.

Furthermore, a thickness of an interfacial layer between the hard coating layer and the base film may be reduced by the combination of the silicone leveling agent and the inorganic antistatic agent. Thus, adhesion of the hard coating layer and the base film may be increased.

Furthermore, a surface roughness and a surface energy of the hard coating layer may be increased. Thus, adhesion with an anti-fingerprint layer may be increased.

BRIEF DESCRIPTION OF THE DRAWINGS

Aspects of one or more exemplary embodiments of the present inventive concept will be more clearly understood from the following detailed description taken in conjunction with the accompanying drawings.

DETAILED DESCRIPTION

Figure 1:
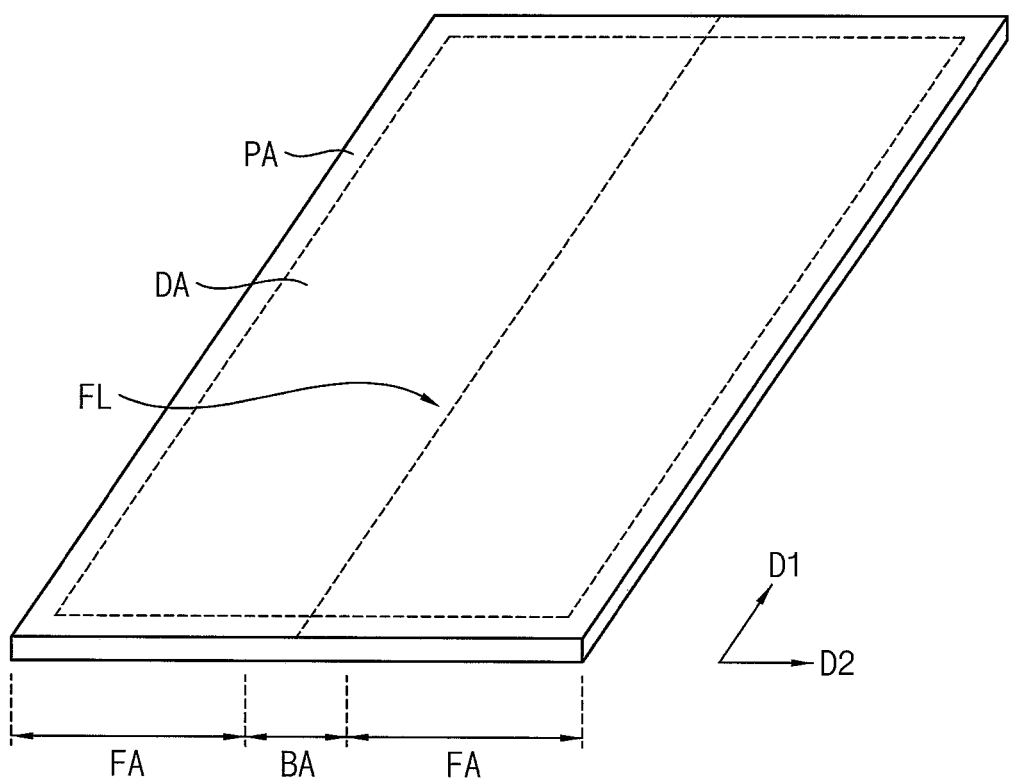
FIG. 1 is a perspective view illustrating a display device according to an exemplary embodiment.

A display device according to exemplary embodiments of the present inventive concept will be described hereinafter with reference to the accompanying drawings, in which some exemplary embodiments are shown. Same or similar reference numerals may be used for same or similar elements in the drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term (meth)acryl is inclusive of acryl and methacryl.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and is below.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A plastic film may have a hardness that is less than a hardness of a glass substrate. Thus, a hard coating layer may be desirable for improving durability of a display device including a plastic film as a window of the display device.

Figure 2:
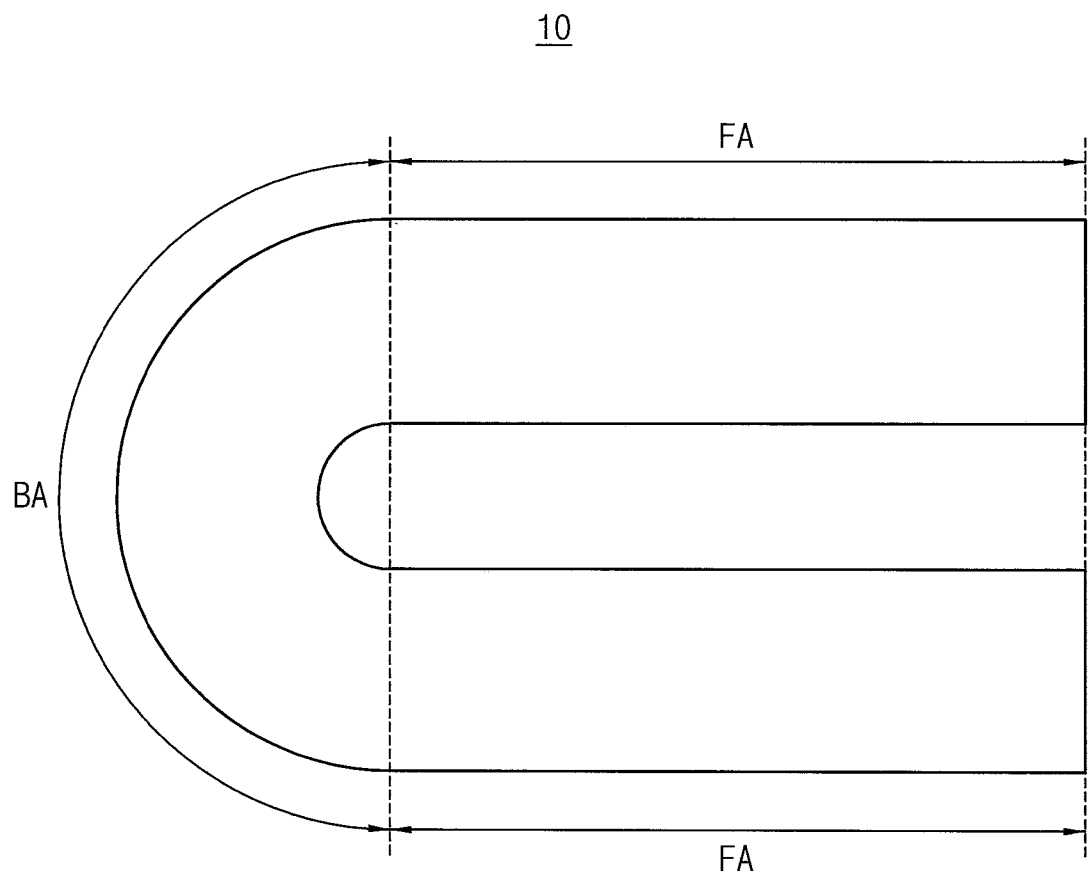
FIG. 2 is a lateral view illustrating a display device according to an exemplary embodiment.

FIG. 1 is a perspective view illustrating a display device according to an exemplary embodiment. FIG. 2 is a lateral view illustrating a display device according to an exemplary embodiment.

Referring to FIGS. 1 and 2, a display device 10 according to an exemplary embodiment includes a display area DA and a peripheral area PA surrounding the display area DA. An array of pixels including a light-emitting element are disposed in the display area DA to generate a light in response to a driving signal. The peripheral area PA may be defined as an area that does not emit a light. A signal wiring for transferring a driving signal, a circuit part for generating a driving signal, or the like may be disposed in the peripheral area PA.

In an exemplary embodiment, the display device 10 may be foldable. For example, the display device 10 may be folded or unfolded by an external force such as operation of a user. For example, as illustrated in FIGS. 1 and 2, the display device 10 may be foldable along a folding line FL extending along a first direction D1. Thus, the display device 10 may include a flat area FA and a bending area BA connecting flat areas FA and having a curvature when folded. The bending area BA may be disposed between flat areas FA in a second direction D2, the second direction D2, being orthogonal to the first direction D1.

In an exemplary embodiment, the display device 10 may have an in-folding structure having a display surface that is not exposed when folded. However, embodiments are not limited thereto. A display device may have an out-folding structure having a display surface exposed when folded.

Furthermore, embodiments are not limited to the configuration illustrated in FIG. 2. For example, a display device may have an asymmetrical structure with is respect to a folding line, or may include a plurality of bending areas such that the display device can be multiple-folded, e.g., folded multiple times.

Figure 3:
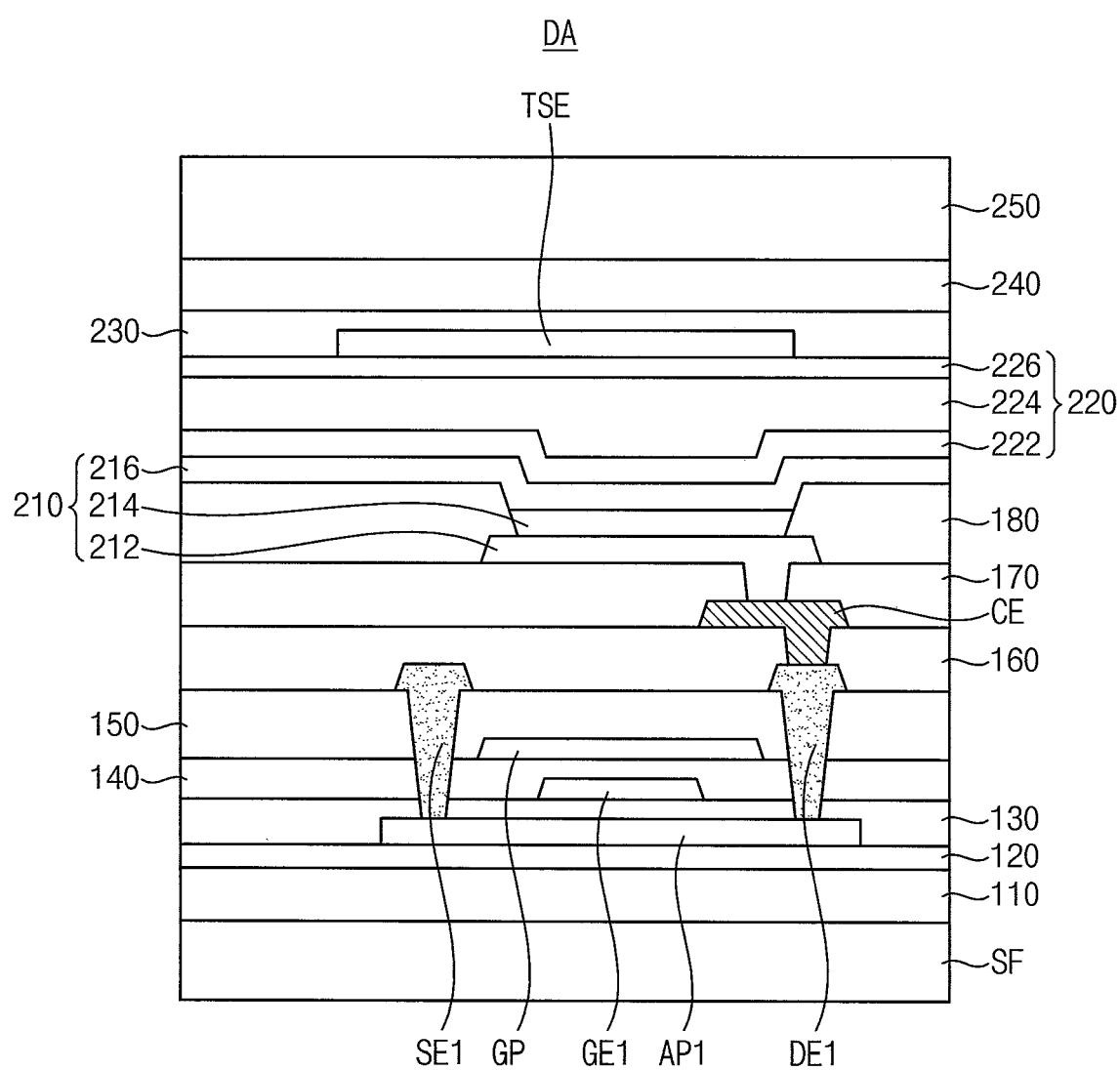
FIG. 3 is a cross-sectional view illustrating a display device according to an exemplary embodiment.

FIG. 3 is a cross-sectional view illustrating a display device according to an exemplary embodiment. FIG. 3 may illustrate a display area in which a light-emitting element is disposed.

Referring to FIG. 3, a pixel unit disposed in the display area DA may include a driving element disposed on a base substrate 110 and a light-emitting element electrically connected to the driving element. In an exemplary embodiment, the light-emitting element may be an organic light-emitting diode.

A supporting film SF may be disposed on a lower surface of the base substrate 110 to support the base substrate 110. In an exemplary embodiment, the supporting film SF may be patterned to reduce stress in the bending area, which is caused by folding.

A buffer layer 120 may be disposed on the base substrate 110. A first active pattern AP1 may be disposed on the buffer layer 120.

For example, the base substrate 110 may be formed of a polymeric material to have a high flexibility. For example, the base substrate 110 may include polyethylene terephthalate, polyethylene naphthalate, polyether ketone, polycarbonate, polyarylate, polyether sulfone, polyimide, or a combination thereof.

The buffer layer 120 may prevent or reduce permeation of impurities, humidity, or external gas from underneath of the base substrate 110, and may planarize, e.g., provide a planar surface to, an upper surface of the base substrate 110. For example, the buffer layer 120 may include an inorganic material such as an oxide, a nitride, or the like.

A first gate electrode GE1 may be disposed on the first active pattern AP1. A first insulation layer 130 may be disposed between the first active pattern AP1 and the first gate electrode GE1.

A gate wiring pattern GP may be disposed on the first gate electrode GE1. The gate wiring pattern GP may include a capacitor electrode for forming a capacitor, a wiring for transferring various signals, or the like.

A second insulation layer 140 may be disposed between the first gate electrode GE1 and the gate wiring pattern GP. A third insulation layer 150 may be disposed on the gate wiring pattern GP.

For example, the first active pattern AP1 may include silicon or a metal oxide semiconductor. In an exemplary embodiment, the first active pattern AP1 may include polycrystalline silicon (polysilicon), which may be doped with n-type impurities or p-type impurities.

In another exemplary embodiment or in another transistor that is not illustrated, an active pattern may include a metal oxide semiconductor. For example, the active pattern may include a two-component compound ($AB_x$, wherein x>0), a ternary compound ($AB_xC'_y$, wherein x>0 and y>0), or a four-component compound ($AB_xC'_yD_z$, wherein x>0, y>0, and z>0), wherein A, B, C', and D are independently indium (In), zinc (Zn), gallium (Ga), tin (Sn), titanium (Ti), aluminum (Al), hafnium (Hf), zirconium (Zr), or magnesium (Mg). For example, the active pattern may include zinc oxide ($ZnO_x$, wherein x>0), gallium oxide ($GaO_x$, wherein x>0), titanium oxide ($TiO_x$, wherein x>0), tin oxide ($SnO_x$, wherein x>0), indium oxide ($InO_x$, wherein x>0), indium-gallium oxide (IGO), indium-zinc oxide (IZO), indium tin oxide (ITO), gallium zinc oxide (GZO), zinc magnesium oxide (ZMO), zinc tin oxide (ZTO), zinc zirconium oxide ($ZnZr_xO_y$, wherein x>0 and y>0), indium-gallium-zinc oxide (IGZO), indium-zinc-tin oxide (IZTO), indium-gallium-hafnium oxide (IGHO), tin-aluminum-zinc oxide (TAZO), indium-gallium-tin oxide (IGTO), or the like.

The first insulation layer 130, the second insulation layer 140, and the third insulation layer 150 may include silicon oxide, silicon nitride, silicon carbide, or a combination thereof. Furthermore, the first insulation layer 130, the second insulation layer 140, and the third insulation layer 150 may include an insulating metal oxide such as aluminum oxide, tantalum oxide, hafnium oxide, zirconium oxide, titanium oxide, or the like. For example, the first insulation layer 130, the second insulation layer 140, and the third insulation layer 150 may have a single-layered structure or a multi-layered structure including silicon nitride and/or silicon oxide, respectively, or may have different structures from each other.

The first gate electrode GE1 and the gate wiring pattern GP may include a metal, a metal alloy, a metal nitride, a conductive metal oxide, or the like. For example, the first gate electrode GE1 and the gate wiring pattern GP may include gold (Au), silver (Ag), aluminum (Al), copper (Cu), nickel (Ni), platinum (Pt), magnesium (Mg), chromium (Cr), tungsten (W), molybdenum (Mo), titanium (Ti), tantalum (Ta), or an alloy thereof, and may have a single-layered structure or a multi-layered structure including different metal layers. In an exemplary embodiment, the first gate electrode GE1 and the gate wiring pattern GP may have a multi-layered structure including at least a molybdenum layer.

A first source metal pattern may be disposed on the third insulation layer 150. The first source metal pattern may include a first source electrode SE1 and a first drain electrode DE1, which contact the first active pattern AP1. The first source electrode SE1 and the first drain electrode DE1 may pass through the insulation layers disposed thereunder to contact the first active pattern AP1, respectively.

A fourth insulation layer 160 may be disposed on the first source metal pattern. A second source metal pattern may be disposed on the fourth insulation layer 160. The second source metal pattern may include a connection electrode CE to electrically connect the first drain electrode DE1 to an organic light-emitting diode 210 disposed thereon. In an exemplary embodiment, the second source is metal pattern may further include a mesh power line to prevent voltage drop of a power applied to the organic light-emitting diode 210. A fifth insulation layer 170 may be disposed on the second source metal pattern.

The first and second source metal patterns may include a metal, a metal alloy, a metal nitride, a conductive metal oxide, or the like. For example, the first and second source metal patterns may include gold (Au), silver (Ag), aluminum (Al), copper (Cu), nickel (Ni), platinum (Pt), magnesium (Mg), chromium (Cr), tungsten (W), molybdenum (Mo), titanium (Ti), tantalum (Ta), or an alloy thereof, and may have a single-layered structure or a multi-layered structure including different metal layers. In an exemplary embodiment, the first and second source metal patterns may have a multi-layered structure including at least an aluminum layer. For example, the first and second source metal patterns may have a stacked structure of an aluminum layer and a titanium layer.

The fourth insulation layer 160 and the firth insulation layer 170 may include an organic material. For example, the fourth insulation layer 160 and the firth insulation layer 170 may include an organic insulation material such as a phenol resin, an acryl resin, a polyimide resin, a polyamide resin, a siloxane resin, an epoxy resin, or the like.

The organic light-emitting diode 210 may be disposed on the fifth insulation layer 170. The organic light-emitting diode 210 may include a first electrode 212 contacting the connection electrode CE, a light-emitting layer 214 disposed on the first electrode 212, and a second electrode 216 disposed on the light-emitting layer 214. The light-emitting layer 214 of the organic light-emitting diode 210 may be disposed in an opening of a pixel-defining layer 180 disposed on the fifth insulation layer 170. The first electrode 212 may be a lower electrode of the organic light-emitting diode 210, and the second electrode 216 may be an upper electrode of the organic light-emitting diode 210.

The first electrode 212 may function as an anode. For example, the first electrode 212 may be formed as a transmitting electrode or a reflecting electrode according to an emission type of the display device. When the first electrode 212 is a transmitting electrode, the first electrode 212 may include indium tin oxide, indium zinc oxide, zinc tin oxide, indium oxide, zinc oxide, tin oxide, or the like. When the first electrode 212 is a reflecting electrode, the first electrode 212 may include gold (Au), silver (Ag), aluminum (Al), copper (Cu), nickel (Ni), platinum (Pt), magnesium (Mg), chromium (Cr), tungsten (W), molybdenum (Mo), titanium (Ti), or a combination thereof, and may have a stacked structure further including the material that may be used for the transmitting electrode.

The pixel-defining layer 180 has the opening exposing at least a portion of the first electrode 212. For example, the pixel-defining layer 180 may include an organic insulating material.

The light-emitting layer 214 may include at least one of a hole injection layer (HIL), a hole transporting layer (HTL), an organic light-emitting layer, an electron transporting layer (ETL), and an electron injection layer (EIL). For example, the light-emitting layer 214 may include a low molecular weight organic compound or a high molecular weight organic compound.

In an exemplary embodiment, the light-emitting layer 214 may emit a red light, a green light, or a blue light. In another exemplary embodiment, the light-emitting layer 214 may emit a white light. The light-emitting layer 214 emitting a white light may have a multiple-layer structure including a red-emitting layer, a green-emitting layer, and a blue-emitting layer, or a single-layer structure including a mixture of a red-emitting material, a green-emitting material, and a blue-emitting material.

The second electrode 216 may be formed as a transmitting electrode or a reflecting electrode according to an emission type of the display device. For example, when the second electrode 216 is a transmitting electrode, the second electrode 216 may include a metal, a metal alloy, a metal nitride, a metal fluoride, a conductive metal oxide, or a combination thereof.

For example, the second electrode 216 may extend continuously across a plurality of pixels in the display area DA. In an exemplary embodiment, a capping layer and a blocking layer may be formed on the second electrode 216.

The display device further includes an encapsulation layer 220 covering the organic light-emitting diode 210. The encapsulation layer 220 may extend cover an entire portion of the display area DA.

For example, the encapsulation layer 220 may have a stacked structure of an inorganic thin film and an organic thin film. For example, as illustrated in FIG. 3, the encapsulation layer 220 may include a first inorganic thin film 222, an organic thin film 224 disposed on the first inorganic thin film 222, and a second inorganic thin film 226 disposed on the organic thin film 224. However, exemplary embodiments are not limited thereto. For example, the encapsulation layer 220 may have a structure including at least two organic thin films and at least three inorganic thin films.

For example, the organic thin film 224 include a cured resin such as polyacrylate or the like. For example, the cured resin may be formed from cross-linking reaction of monomers. For example, the inorganic thin films 222 and 226 may include an inorganic material such as silicon oxide, silicon nitride, silicon carbide, aluminum oxide, tantalum oxide, hafnium oxide, zirconium oxide, titanium oxide, or the like.

In an exemplary embodiment, a touch-sensing part may be disposed on the encapsulation layer 220. The touch-sensing part may sense input position by contact. The touch-sensing part may be formed directly on the encapsulation layer 220 or may be combined with the encapsulation layer 220 as a screen panel after is the touch-sensing part and the encapsulation layer 220 are individually manufactured.

For example, a touch-sensing electrode TSE and a touch insulation layer 230 covering the touch-sensing electrode TSE may be disposed on the encapsulation layer 220. For example, the touch-sensing electrode TSE may include a transparent conductive material such as indium tin oxide, indium zinc oxide, or the like.

A polarization layer 240 and a protective window 250 may be disposed on the touch-sensing part. An adhesive agent or a transparent adhesive film may be provided between the polarization layer 240 and the touch-sensing part and between the polarization layer 240 and the protective window 250.

Figure 4:
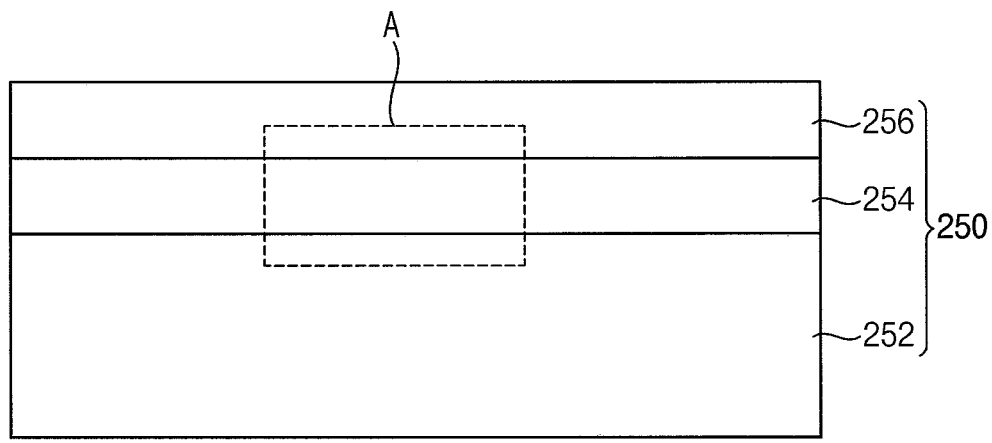
FIG. 4 is a cross-sectional view illustrating a protective window of a display device according to an exemplary embodiment.
Figure 5:
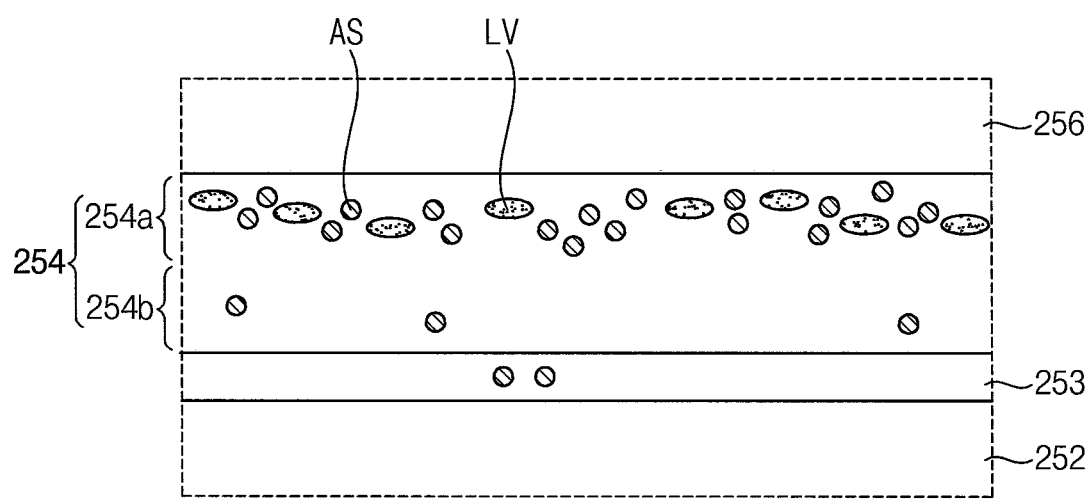
FIG. 5 is an enlarged cross-sectional view illustrating the region 'A' of FIG. 4.

FIG. 4 is a cross-sectional view illustrating a protective window of a display device according to an exemplary embodiment. FIG. 5 is an enlarged cross-sectional view illustrating the region 'A' of FIG. 4.

Referring to FIG. 4, a protective window 250 includes a base film 252 and a hard coating layer 254 disposed on the base film 252. In an exemplary embodiment, the protective window 250 may further include an anti-fingerprint layer 256.

The base film 252 is a flexible film including a polymeric material. Thus, the base film 252 may provide flexibility to the protective window 250 so that the protective window 250 may be repeatedly folded by an external force.

For example, the base film 252 may include polyimide, polyacrylate, PMMA (polymethyl methacrylate), PC (polycarbonate), PEN (polyethylene naphthalate), polyvinylidene chloride, PVDF (polyvinylidene difluoride), polystyrene, ethylene vinyl alcohol copolymer, or a combination thereof. In an exemplary embodiment, the base film 252 may include polyimide.

For example, a thickness of the base film 252 may be 30 μm 100 μm.

The hard coating layer 254 includes a cross-linked cured resin. Thus, the hard coating layer 254 has a cross-linked structure and a greater hardness than the base film 252. Thus, the hard coating layer 254 may protect the base film 252. For example, the hard coating layer 254 may include a cured product of at least one of a (meth)acrylate compound, a curable siloxane compound, or a curable silsesquioxane compound. In an exemplary embodiment, the hard coating layer 254 may include a cured product of a (meth)acrylate compound.

For example, a thickness of the hard coating layer 254 may be 5 μm 50 μm.

The hard coating layer 254 may further include a leveling agent LV and an antistatic agent AS. The leveling agent LV may control a flatness of the hard coating layer 254. The antistatic agent AS may prevent static electricity. Thus, interference of a touch-sensing part by noise may be prevented. In an exemplary embodiment, the protective window 250 including the hard coating layer 254 may have a surface resistance between $10^9$ ohms per square (Ω/sq) and $10^{13}$ Ω/sq.

The anti-fingerprint layer 256 may function as an anti-fouling layer to prevent contamination of the protective window 250 due to fingerprints, other oil-containing compositions, or the like. For example, the anti-fingerprint layer 256 may include a fluorine-containing compound. In an exemplary embodiment, the anti-fingerprint layer 256 may include a fluorine-containing silane or a reaction product thereof.

In an exemplary embodiment, the hard coating layer 254 may include a silicone leveling agent and an inorganic antistatic agent.

For example, the inorganic antistatic agent may include a metal oxide. For example, the inorganic antistatic agent may include indium oxide, zinc oxide, tin oxide, antimony oxide, or the like. Particularly, the inorganic antistatic agent may include $Sb_2O_5$, $SnO_2$, or a combination thereof. In an exemplary embodiment, the inorganic antistatic agent may include $Sb_2O_5$. The hard coating layer including $Sb_2O_5$ as the antistatic agent may inhibit water hold-up. Furthermore, since the hard coating layer may have a low haze, decrease of transmittance may be prevented.

The silicone leveling agent includes diorganosiloxane groups, for example dimethylsiloxane groups. Examples of the silicone leveling agent may be commercially available. For example, BYK 331, BYK 333, BYK 378 (BYK Chemi), Tego 410, Tego 432, Tego 450 (Tego), or the like may be used for the silicone leveling agent.

The silicone leveling agent may localize the inorganic antistatic agent in the hard coating layer 254, e.g., the silicone leveling agent may increase a concentration of the inorganic antistatic agent in an area of the hard coating layer 254. For example, as illustrated in FIG. 5, the silicone leveling agent may interact with the inorganic antistatic agent so that a density of the inorganic antistatic agent is greater in an upper area 254a of the hard coating layer 254 than in a lower area 254b. Thus, an ability for preventing humidity permeation of the hard coating layer 254 may be increased.

For example, summation of contents, e.g., a sum of the content, of the silicone leveling agent and the inorganic antistatic agent may be equal to or less than 5 wt %, based on the total weight of the hard coating layer 254. For example, a content of the silicone leveling agent in the hard coating layer 254 may be equal to or less than 2 wt %, for example, 0.1 wt % to 1 wt %. For example, a content of the inorganic antistatic agent in the hard coating layer 254 may be equal to or less than 2 wt %, for example, 0.05 wt % to 0.5 wt %. When amounts of the silicone leveling agent and the inorganic antistatic agent are greater than the disclosed ranges, haze may be increased. When amounts of the silicone leveling agent and the inorganic antistatic agent are less than the disclosed ranges, an antistatic ability may be reduced, or a moisture absorption may be increased.

In an exemplary embodiment, an interfacial layer 253 may be formed between the hard coating layer 254 and the base film 252. The interfacial layer 253 may be formed by dissolution of one or more components, for example one or more polymeric components of the base film 252 or the like in the process of forming the hard coating layer 254. For example, the interfacial layer 253 may be defined by an area in which a first component from the base film 252 and a second component from the hard coating layer 254 are mixed. For example, the first component may include a polymeric material such as polyimide, and the second component may include a (meth)acrylate compound, an antistatic agent, or the like from hard coating layer 254. Thus, the first component and the second component are preferably not the same. The interfacial layer 253 may have a structure which is visually distinguishable from the base film 252 and the hard coating layer 254 in the image of a scanning electron microscope or the like.

In an exemplary embodiment, a thickness of the interfacial layer 253 may be equal to or less than 1 μm. For example, a thickness of the interfacial layer 253 may be 0.1 μm to 0.8 μm. A thickness of the interfacial layer 253 may be 0.3 μm to 0.4 μm.

When a thickness of the interfacial layer 253 is greater than 1 μm, adhesion of the base film 252 and the hard coating layer 254 may be reduced. Thus, humidity permeation may be increased, and crack may progress along the interfacial layer 253.

In an exemplary embodiment, the hard coating layer 254 may have a low moisture absorption even under a condition of a high temperature and a high humidity. For example, the hard coating layer 254 may have a moisture absorption equal to or less than 2% at 60° C. and 93% humidity. Preferably, the hard coating layer 254 may have a moisture absorption of 1% to 1.8% at 60° C. and 93% humidity.

Furthermore, the hard coating layer 254 may have an improved indentation hardness (Vicker's hardness). For example, the Vicker's hardness of the hard coating layer 254 may be 30 to 35.

Furthermore, an upper surface of the hard coating layer 254 may have an increased surface roughness and surface energy. Thus, adhesion with the anti-fingerprint layer 256 combined with the upper surface of the hard coating layer 254, e.g., adhesion of the anti-fingerprint layer 256 and the upper surface of the hard coating layer 254, may be increased.

For example, the surface roughness (RMS or root mean square) of the upper surface of the hard coating layer 254 may be equal to or greater than 1 nm. Preferably, the surface roughness (RMS) of the upper surface of the hard coating layer 254 may be 1 nm to 2 nm, and may be more preferably 1.2 nm to 1.7 nm. When the surface roughness of the upper surface of the hard coating layer 254 greater than the disclosed ranges, haze may be increased.

For example, the surface energy of the hard coating layer 254 may be equal to or greater than 25 joules per square meter ($J/m^2$), and may be equal to or greater than 27 $J/m^2$.

A coating composition for forming the hard coating layer 254 according to an exemplary embodiment may include a (meth)acrylate compound, a silicone leveling agent, an inorganic antistatic agent, a photo-initiator, and a solvent.

For example, the (meth) acrylate compound may include a polyfunctional urethane (meth)acrylate compound, a polyfunctional (meth)acrylate compound having oxyethylene group, or a combination thereof.

For example, the polyfunctional urethane (meth)acrylate compound may have a cyclohexyl group. For example, the polyfunctional urethane (meth)acrylate s compound having a cyclohexyl group may be produced by condensation-reacting a diisocyanate having a cyclohexyl group and a polyfunctional (meth)acrylate having a hydroxy group.

For example, the diisocyanate having a cyclohexyl group may include 1,4-cyclohexyl diisocyanate, isophorone diisocyanate, 4,4-dicyclohexylmethane diisocyanate, or a combination thereof.

For example, the polyfunctional (meth)acrylate having a hydroxy group may include trimethylolpropane di(meth)acrylate, pentaerythritol tri(meth)acrylate, dipentaerythritol penta(meth)acrylate, or a combination thereof.

For example, the polyfunctional urethane(meth)acrylate compound may be represented by the following Chemical Formula 1 or 2.

Chemical Formula 1

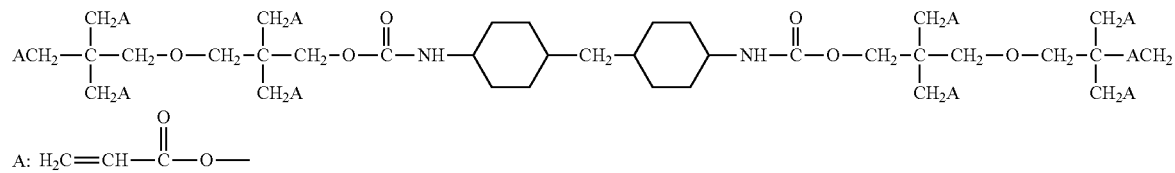

Chemical Formula 2

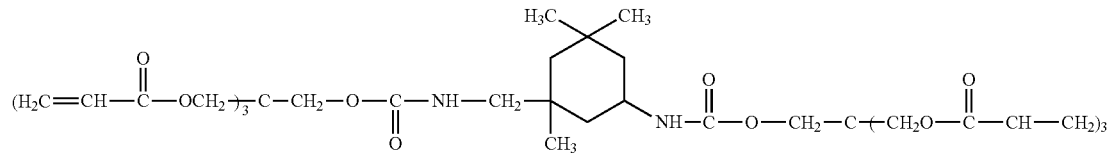

The polyfunctional (meth)acrylate compound having an oxyethylene group may be prepared by addition-reacting ethylene oxide to a polyhydric alcohol to obtain a polyfunctional alcohol having an oxyethylene group and then condensation-reacting (meth)acrylic acid with the polyfunctional alcohol.

For example, the polyhydric alcohol may include glycerol, trimethylol propane, pentaerythritol, dipentaerythritol, or a combination thereof.

For example, the polyfunctional (meth)acrylate compound having an oxyethylene group may include trimethylol propane(EO)$_3$ tri(meth)acrylate, (ethoxylated trimethylol propane tri(meth)acrylate), trimethylol propane(EO)$_6$ tri(meth)acrylate, trimethylol propane(EO)$_9$ tri(meth)acrylate, glycerin(EO)$_3$ tri(meth)acrylate, glycerin(EO)$_6$ tri(meth)acrylate, glycerin(EO)$_9$ tri(meth)acrylate, pentaerythritol(EO)$_4$ tetra(meth)acrylate, pentaerythritol(EO)$_8$ tetra(meth)acrylate, pentaerythritol(EO)$_{12}$ tetra(meth)acrylate, dipentaerythritol(EO)$_6$ hexa(meth)acrylate, dipentaerythritol(EO)$_{12}$ hexa(meth)acrylate, dipentaerythritol(EO)$_{18}$ hexa(meth)acrylate, or a combination thereof.

For example, the polyfunctional (meth)acrylate compound having an oxyethylene group may be a polyfunctional acrylate compound represented by the following Chemical Formula 3 or 4.

Chemical Formula 3

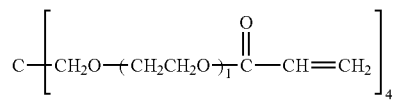

Chemical Formula 4

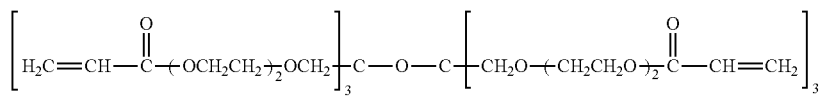

In an exemplary embodiment, a content of the (meth)acrylate compound may be 60 wt % to 90 wt %, based on the total weight of the solid content of the coating composition. For example, a content of the polyfunctional urethane (meth)acrylate compound may be 30 wt % to 60 wt %, and a content of the polyfunctional (meth)acrylate compound having an oxyethylene group may be 30 wt % to 50 wt %.

In an exemplary embodiment, a content of the silicone leveling agent may be equal to or less than 2 wt %, based on the total weight of the solid content, and may be 0.1 wt % to 1 wt %.

In an exemplary embodiment, a content of the inorganic antistatic agent may be equal to or less than 2 wt %, based on the total weight of the solid content, and may be 0.05 wt % to 0.5 wt %. For example, the inorganic antistatic agent may be added with a colloidal state and mixed with other components.

In an exemplary embodiment, the photo-initiator may include a Type I photo-initiator in which radicals are generated by decomposition of molecules due to a difference in chemical structure or molecular binding energy, a Type II (hydrogen abstraction type) photo-initiator in which tertiary amines are incorporated as a co-initiator, or a combination thereof.

For example, the Type I photo-initiator may include an acetophenone such as 4-phenoxydichloroacetophenone, 4-t-butyldichloroacetophenone, 4-t-butyltrichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 1-hydroxycyclohexyl phenyl ketone, or the like, a benzoin such as benzoin, benzoin methyl ether, benzoin ethyl ether, benzyl dimethyl ketal, or the like, an acylphosphine oxide, or a titanocene compound.

For example, the Type II photo-initiator may include a benzophenone such as benzophenone, benzoyl benzoic acid, benzoyl benzoic acid methyl ether, 4-phenylbenzophenone, hydroxybenzophenone, 4-benzoyl-4'-methyldiphenylsulfide, 3,3'-methyl-4-methoxybenzophenone, or the like, or a thioxanthone such as thioxanthone, 2-chlorothioxanthone, 2-methylthioxanthone, 2,4-dimethylthioxanthone, isopropylthioxanthone, or the like.

For example, a content of the photo-initiator may be 0.1 wt % to 5 wt %, based on the total weight of the solid content.

For example, the solvent may include an alcohol (for example, methanol, ethanol, isopropanol, butanol propylene glycol methoxy alcohol), a ketone (for example, methyl ethyl ketone, methyl butyl ketone, methyl isobutyl ketone, diethyl ketone, dipropyl ketone, etc.), an acetate (for example, methyl acetate, ethyl acetate, butyl acetate, propylene glycol methoxy acetate, etc.), a cellosolve (for example, methyl cellosolve, ethyl cellosolve, propyl cellosolve, etc.), a hydrocarbon (for example, n-hexane, n-heptane, benzene, toluene, xylene, etc.), or a combination thereof.

For example, a content of the solvent may be 10 wt % to 80 wt %, based on the total weight of the coating composition.

The coating composition may further include an additive as desired. For example, the coating composition may further include inorganic nano-particles, a stabilizer, a surfactant, an antifouling agent, or the like. Particular materials and contents thereof for the additive may be appropriately selected according to conventional methods in the art.

The hard coating layer 254 may be formed by coating the coating composition on the base film 252 and photo-curing the coating composition.

For example, the anti-fingerprint layer 256 may be formed by coating a coating composition including a fluorine-containing silane such as methyltrifluorosilane, tetrafluorosilane, 3,3,3-trifluoropropyltrimethoxysilane, 3,3,3-trifluoropropyltriethoxysilane, tridecafluorooctyltrimethoxysilane, tridecafluorooctyltriethoxysilane, or the like and curing the coating composition. For example, the coating composition may be coated by a spraying method. For example, a thickness of the anti-fingerprint layer 256 may be 100 angstroms (Å) to 1,000 Å.

According to an exemplary embodiment, a hard coating layer includes a silicone leveling agent instead of another organic leveling agent such as a (meth) acryl-containing leveling agent, and includes a metal oxide antistatic agent instead of an ionic antistatic agent including ammonium (NH4+), phosphonium (PH4+), imidazolium, pyridinium, Li+, or the like. Thus, a content of ionic materials in the hard coating layer may be reduced. A (meth)acryl-containing leveling agent includes any oligomer or polymer derived from polymerization of an acryl or a methacryl monomer, e.g., acrylonitrile, methacrylonitrile, acrylamide, methacrylamide, acrylic acid, methacrylic acid, or a (C1-C8 alkyl) ester of acrylic or methacrylic acid, optionally with one or more non-acryl-containing comonomers.

Furthermore, a density of an inorganic antistatic agent in a surface area of the hard coating layer may be increased by combination of the silicone-leveling agent and the inorganic antistatic agent.

Thus, a moisture absorption of the hard coating layer and the base film may be reduced. Thus, damage (for example, wrinkle, whitening, or crack) to or in a protective window including the hard coating layer may be prevented. For example, the hard coating layer may have a low moisture absorption at a high temperature and a high humidity, and may prevent decrease of Young's modulus.

Furthermore, a thickness of an interfacial layer between the hard coating layer and the base film may be reduced by combination of the silicone–leveling agent and the inorganic antistatic agent. Thus, adhesion of the hard coating layer and the base film may be increased.

Furthermore, a surface roughness and a surface energy of the hard coating layer may be increased. Thus, adhesion with an anti-fingerprint layer may is be increased.

Hereinafter, effects of exemplary embodiments will be explained with reference particular examples.

EXAMPLE 1

A hard coating composition including a (meth)acrylate compound, a photoinitiator (IRGACURE), a silicone leveling agent, $Sb_2O_5$ as an antistatic agent, and methyl ethyl ketone as a solvent was coated on a polyimide (PI) film having a thickness of about 40 micrometers (μm) and cured to form a hard coating layer having a thickness of about 10 μm.

EXAMPLE 2

A fluorine-containing silane was spray-coated on the hard coating layer of Example 1 to form an anti-fingerprint layer having a thickness of about 500 angstroms (Å).

COMPARATIVE EXAMPLE 1

A hard coating layer was formed on an polyimide film through a same method as Example 1 except for using a carbon-containing (acrylic) leveling agent and a lithium-ion antistatic agent instead of the silicone leveling agent and the $Sb_2O_5$ antistatic agent.

COMPARATIVE EXAMPLE 2

A fluorine-containing silane was spray-coated on the hard coating layer of Comparative Example 1 to form an anti-fingerprint layer having a thickness of about 500 Å.

The percent moisture absorption at 60° C. and 93% humidity, the Young's modulus at 60° C. and 93% humidity, the thickness of the interfacial layer, the surface energy and the surface roughness (5 μm×5 μm) were measured and represented in the following Table 1.

TABLE 1

|  | Example 1 | | Comparative Example 1 | |
| --- | --- | --- | --- | --- |
| Moisture absorption (%) | PI film<br>Hard coating layer | 1.68~1.80<br>1.74~2.00 | PI film<br>Hard coating layer | 1.90<br>2.41 |
| Young's Modulus (gigapascals, (GPa) | 5.2~5.3 | | 4.96 | |
| Thickness of interfacial layer ((μm)) | 0.363 | | 1.34 | |
| Surface energy (J/m$^2$) | 27.09 | | 24.82 | |
| Surface roughness (nm) | 1.2~1.5 | | 0.9 | |

In order to evaluate adhesion reliability of the base film and the hard coating layer at a high temperature and a high humidity, samples of Example 1 and Comparative Example 1 were repeatedly folded by 200,000 times at 60° C. and 93% humidity. Thereafter, a bending portion and a non-bending portion of the hard coating layers were cut thereby forming a test area of 100 pieces (10 pieces×10 pieces in each of the bending portion and the non-bending portion of the hard coating layers). An adhesive tape was attached to and separated from the test area 3 times, and thus obtained results (the number of remaining pieces/100 (100%)) were represented by the following Table 2.

TABLE 2

| Number of test | Example 1 | | Comparative Example 1 | |
| --- | --- | --- | --- | --- |
| | Unbending portion | Bending portion | Unbending portion | Bending portion |
| 1 | 100/100 (100%) | 100/100 (100%) | 100/100 (100%) | 100/100 (100%) |
| 2 | 100/100 (100%) | 100/100 (100%) | 85/100 (85%) | 83/100 (83%) |
| 3 | 100/100 (100%) | 100/100 (100%) | 90/100 (90%) | 90/100 (90%) |
| 4 | 100/100 (100%) | 100/100 (100%) | 100/100 (100%) | 98/100 (98%) |

Referring to Table 1, it can be noted that the samples of Examples can reduce moisture absorption of the PI film and the hard coating layer, and can prevent decrease of Young's modulus at a high temperature and a high humidity.

Referring to Table 2, it can be noted that the interfacial layer having a smaller thickness can increase adhesion reliability between the hard coating layer and the base film.

In order to evaluate adhesion reliability of the anti-fingerprint film and the hard coating layer at a high temperature and a high humidity, samples of Example 2 and Comparative Example 2 were repeatedly folded by 200,000 times at 60° C. and 93% humidity. Thereafter, a bending portion and a non-bending portion of the hard coating layers were cut thereby forming a test area of 100 pieces (10 pieces×10 pieces in each of the bending portion and the non-bending portion of the hard coating layers). An adhesive tape were attached to and separated from the test area by 3 times, and thus obtained results (the number of remaining pieces/100) were represented by the following Table 3.

TABLE 3

| Number of test | Example 1 | | Comparative Example 1 | |
| --- | --- | --- | --- | --- |
| | Unbending portion | Bending portion | Unbending portion | Bending portion |
| 1 | 100/100 (100%) | 100/100 (100%) | 90/100 (90%) | 77/100 (77%) |
| 2 | 100/100 (100%) | 100/100 (100%) | 100/100 (100%) | 100/100 (100%) |
| 3 | 100/100 (100%) | 100/100 (100%) | 100/100 (100%) | 100/100 (100%) |
| 4 | 100/100 (100%) | 100/100 (100%) | 100/100 (100%) | 100/100 (100%) |

Referring to Tables 1 and 3, it can be noted that the hard coating layer having a larger surface energy and a larger, e.g., greater, surface roughness can increase adhesion reliability between the hard coating layer and the anti-fingerprint layer.

Exemplary embodiments may be applied to various display devices. For example, exemplary embodiment may be applied to a vehicle-display device, a ship-display device, an aircraft-display device, a portable communication device, a display device for display or for information transfer, a medical-display device, etc.

The foregoing is illustrative of exemplary embodiments and is not to be construed as limiting thereof. Although exemplary embodiments have been described, those skilled in the art will readily appreciate that many modifications are possible in the exemplary embodiments without materially departing from the novel teachings and aspects of the present inventive concept. Accordingly, all such modifications are intended to be included within the scope of the present inventive concept. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the present inventive concept, as set forth in the following claims and equivalents thereof.

What is claimed is:

1. A protective window comprising:
   a flexible base film including polyimide;
   a hard coating layer disposed on the flexible base film; and
   an interfacial layer between the hard coating layer and the flexible base film,
   wherein the hard coating layer comprises a silicone leveling agent and an inorganic antistatic agent,
   wherein the hard coating layer comprises an upper area, and a lower area disposed between the upper area and the flexible base film, and a density of the inorganic antistatic agent in the upper area is greater than a density of the inorganic antistatic agent in the lower area,
   wherein the interfacial layer includes polyimide and an inorganic antistatic agent including a same material as the inorganic antistatic agent of the hard coating layer.

2. The protective window of claim 1, wherein the inorganic antistatic agent comprises indium oxide, zinc oxide, tin oxide, antimony oxide, or a combination thereof.

3. The protective window of claim 1, wherein the inorganic antistatic agent comprises $Sb_2O_5$, $SnO_2$, or a combination thereof.

4. The protective window of claim 3, wherein a content of the silicone leveling agent in the hard coating layer is greater than 0 weight percent and equal to or less than 2 weight percent, and a content of the inorganic antistatic agent in the hard coating layer is greater than 0 weight percent and equal to or less than 2 weight percent.

5. The protective window of claim 3, wherein a content of the silicone leveling agent in the hard coating layer is 0.1 weight percent to 1 weight percent, and a content of the inorganic antistatic agent in the hard coating layer is 0.05 weight percent to 0.5 weight percent.

6. The protective window of claim 1, wherein the hard coating layer further comprises a cured product of a (meth) acrylate compound.

7. The protective window of claim 1, wherein a surface roughness of the hard coating layer is 1 nanometer to 2 nanometers.

8. The protective window of claim 1, wherein the hard coating layer further comprises an anti-fingerprint layer, the anti-fingerprint layer comprising a fluorine-containing compound, wherein the fluorine-containing compound comprises a fluorine containing silane, and wherein a thickness of the anti-fingerprint layer is 100 angstroms to 1,000 angstroms.

9. The protective window of claim 1, wherein a thickness of the interfacial layer is greater than 0 micrometers and equal to or less than 1 micrometer.

10. The protective window of claim 1, wherein a moisture absorption of the hard coating layer is equal to or less than 2% at 60° C. and 93% humidity.

11. A display device comprising:
   a base substrate;
   a light-emitting element array disposed on the base substrate;
   an encapsulation layer covering the light-emitting element array; and
   a protective window disposed on the encapsulation layer, wherein the protective window comprises:
a flexible base film including polyimide;
a hard coating layer disposed on the flexible base film; and
an interfacial layer between the hard coating layer and the flexible base film,
wherein the hard coating layer comprises a silicone leveling agent and an inorganic antistatic agent,
wherein the hard coating layer comprises an upper area and a lower area disposed between the upper area and the flexible base film, and a density of the inorganic antistatic agent in the upper area is greater than a density of the inorganic antistatic agent in the lower area,
wherein the interfacial layer includes polyimide and an inorganic antistatic agent including a same material as the inorganic antistatic agent of the hard coating layer.

12. The display device of claim 11, further comprising a touch-sensing part disposed between the encapsulation layer and the protective window.

13. The display device of claim 11, wherein the display device is foldable by an external force.

14. The display device of claim 11, wherein the inorganic antistatic agent comprises $Sb_2O_5$, $SnO_2$, or a combination thereof.

15. The display device of claim 11, wherein a content of the silicone leveling agent in the hard coating layer is 0.1 weight percent to 1 weight percent, and a content of the inorganic antistatic agent in the hard coating layer is 0.05 weight percent to 0.5 weight percent.

16. The display device of claim 11, wherein a surface roughness of the hard coating layer is 1 nanometer to 2 nanometers.

17. The display device of claim 11, wherein the hard coating layer further comprises an anti-fingerprint layer, the anti-fingerprint layer comprising a fluorine-containing compound.

18. The display device of claim 11, wherein a thickness of the interfacial layer is greater than 0 micrometers and equal to or less than 1 micrometer.

19. The display device of claim 11, wherein a moisture absorption of the hard coating layer is equal to or less than 2% at 60° C. and 93% humidity.

* * * * *